(12) United States Patent
Schlattmann et al.

(10) Patent No.: US 9,838,604 B2
(45) Date of Patent: Dec. 5, 2017

(54) METHOD AND SYSTEM FOR STABILIZING VIDEO FRAMES

(71) Applicant: AGT INTERNATIONAL GMBH, Zurich (CH)

(72) Inventors: Markus Schlattmann, Griesheim (DE); Rohit Mande, Pune (IN)

(73) Assignee: AG INTERNATIONAL GMBH, Zurich (CH)

( * ) Notice: Subject to any disclaimer, the term of this patent is extended or adjusted under 35 U.S.C. 154(b) by 0 days.

(21) Appl. No.: 14/883,743

(22) Filed: Oct. 15, 2015

(65) Prior Publication Data

US 2017/0111585 A1 Apr. 20, 2017

(51) Int. Cl.
| | |
|---|---|
| H04N 5/228 | (2006.01) |
| H04N 9/64 | (2006.01) |
| H04N 5/232 | (2006.01) |
| G06K 9/46 | (2006.01) |
| G06K 9/62 | (2006.01) |

(52) U.S. Cl.
CPC ....... H04N 5/23264 (2013.01); G06K 9/4671 (2013.01); G06K 9/6218 (2013.01)

(58) Field of Classification Search
CPC .............. G06K 9/00744; G06K 9/4676; H04L 2209/60
See application file for complete search history.

(56) References Cited

U.S. PATENT DOCUMENTS

| | | | |
|---|---|---|---|
| 8,054,881 B2 | 11/2011 | Mohanty et al. | |
| 8,385,732 B2 | 2/2013 | Zuniga et al. | |
| 8,594,488 B1* | 11/2013 | Grundmann | H04N 9/87 348/169 |
| 2007/0002146 A1* | 1/2007 | Tico | G06T 5/50 348/208.1 |
| 2010/0092093 A1* | 4/2010 | Akatsuka | G06K 9/6211 382/203 |

(Continued)

OTHER PUBLICATIONS

Abdullah L. M et al. "Video stabilization based on point feature matching technique" In Control and System Graduate Research Colloquium (ICSGRC), IEEE. 303-307. (Jul. 2012).

(Continued)

*Primary Examiner* — Trung Diep
(74) *Attorney, Agent, or Firm* — Browdy and Neimark

(57) ABSTRACT

A method, system, and computer program product for stabilizing frames, the method comprising: receiving a frame sequence comprising three or more frames, including a current frame; determining salient feature points within the frames; matching the salient feature points between the frames; dropping salient feature points associated with advancing objects; dropping salient feature points associated with objects moving in shaking movements; computing a transformation between pairs of consecutive frames from amongst the at least three frames, based upon non-dropped salient feature points, thereby obtaining a multiplicity of transformations; determining a center position for the frames based upon the multiplicity of transformations; determining a stabilizing transformation from a current frame to the center position; and applying the stabilizing transformation to the current frame to obtain a stabilized frame.

19 Claims, 4 Drawing Sheets

(56) References Cited

U.S. PATENT DOCUMENTS

| | | | |
|---|---|---|---|
| 2010/0239172 A1* | 9/2010 | Akiyama | G06T 7/33 382/190 |
| 2011/0038540 A1* | 2/2011 | Ahn | G06K 9/4671 382/173 |
| 2011/0085049 A1* | 4/2011 | Dolgin | H04N 5/23248 348/208.4 |
| 2011/0176014 A1 | 7/2011 | Hong et al. | |
| 2012/0105654 A1 | 5/2012 | Kwatra et al. | |
| 2013/0259228 A1* | 10/2013 | Ren | H04L 9/3247 380/200 |

OTHER PUBLICATIONS

Hong, W. et al. "Video stabilization and rolling shutter distortion reduction" In Image Processing (ICIP), 2010 17th IEEE International Conference on. 3501-3504 (Sep. 2010).

Battiato, S. "SIFT features tracking for video stabilization" In Image Analysis and Processing, 2007. ICIAP 2007. 14th International Conference on (pp. 825-830). IEEE. (Sep. 2007).

Lee, K. Y., et al. "Video stabilization using robust feature trajectories" In Computer Vision, 2009 IEEE 12th International Conference on. 1397-1404. (Sep. 2009).

Matsushita Y. et al. "Full-frame video stabilization" In Computer Vision and Pattern Recognition, 2005. CVPR 2005. IEEE Computer Society Conference on. 1: 50-57. IEEE. (Jun. 2005).

Veon, K. et al "Video stabilization using SIFT-ME features and fuzzy clustering" In Intelligent Robots and Systems (IROS), 2011 IEEE/RSJ International Conference on. 2377-2382. (Sep. 2011).

http://www.axis.com/files/whitepaper/wp_image_stabilization_57110_en_1406_lo.pdf, (Feb. 25, 2015).

Dragicevic, et al., Video Browsing by Direct Manipulation, Proceedings of the SIGCHI Conference on Human Factors in Computing Systems, ACM, Florence, Italy, 2008, pp. 237-246.

Lee, et al., Fast 3D video stabilization using ROI-based warping, Journal of Visual Communication and Image Representation, 2014, pp. 943-950, vol. 25.

Rajeswararao, et al., Stabilization of jittery videos using matching techniques, International Journal of Advanced Research in Electronics and Communication Engineering (IJARECE), Dec. 2014, pp. 1895-1899, vol. 3, issue 12.

* cited by examiner

METHOD AND SYSTEM FOR STABILIZING VIDEO FRAMES

TECHNICAL FIELD

The present disclosure relates to stabilizing frames captured by video cameras in general, and to a method and system for stabilizing frames captured by fixed location video cameras, in particular.

BACKGROUND

Many locations are constantly or intermittently captured by video cameras. However, due to movements of the camera or the captured objects, the images are not clear enough, and stabilization may be required.

Abdullah, Tahir, and Samad in "Video stabilization based on point feature matching technique" published in Control and System Graduate Research Colloquium (ICSGRC), 2012 IEEE, vol., no., pp. 303, 307, 16-17 Jul. 2012 disclose an algorithm to stabilize jittery videos directly without the need to estimate camera motion. A stable output video will be attained without the effect of jittery that caused by shaking the handheld camera during video recording. Firstly, salient feature points from each frame of the input video is identified and processed followed by optimizing and stabilize the video. Optimization includes the quality of the video stabilization and less unallied area after the process of stabilization.

Wei, Wei, and Batur in "Video stabilization and rolling shutter distortion reduction" published in IEEE International Conference on Image Processing (ICIP), 2010 17th, vol., no., pp. 3501, 3504, 26-29 Sep. 2010 and in, presents an algorithm that stabilizes video and reduces rolling shutter distortions using a six-parameter affine model that explicitly contains parameters for translation, rotation, scaling, and skew to describe transformations between frames. Rolling shutter distortions, including wobble, skew and vertical scaling distortions, together with both translational and rotational jitter are corrected by estimating the parameters of the model and performing compensating transformations based on those estimates. The results show the benefits of the proposed algorithm quantified by the Interframe Transformation Fidelity (ITF) metric.

US2011017601 discloses a method of processing a digital video sequence that includes estimating compensated motion parameters and compensated distortion parameters (compensated M/D parameters) of a compensated motion/distortion (M/D) affine transformation for a block of pixels in the digital video sequence, and applying the compensated M/D affine transformation to the block of pixels using the estimated compensated M/D parameters to generate an output block of pixels, wherein translational and rotational jitter in the block of pixels is stabilized in the output block of pixels and distortion due to skew, horizontal scaling, vertical scaling, and wobble in the block of pixels is reduced in the output block of pixels.

Battiato, Gallo, Puglisi and Scellato in "SIFT Features Tracking for Video Stabilization" published in the 14th International Conference on Image Analysis and Processing, 2007, pp. 825, 830, 10-14 Sep. 2007 discloses a video stabilization algorithm based on the extraction and tracking of scale invariant feature transform features through video frames. Implementation of SIFT operator is analyzed and adapted to be used in a feature-based motion estimation algorithm. SIFT features are extracted from video frames and then their trajectory is evaluated to estimate interframe motion. A modified version of iterative least squares method is adopted to avoid estimation errors and features are tracked as they appear in nearby frames to improve video stability. Intentional camera motion is eventually filtered with adaptive motion vector integration. Results confirm the effectiveness of the method.

Ken-Yi, Yung-Yu, Bing-Yu and Ming Ouhyoung in "Video stabilization using robust feature trajectories" published in Computer Vision, 2009 IEEE 12th International Conference on, vol., no., pp. 1397, 1404, Sep. 29, 2009-Oct. 2, 2009, disclose a method to directly stabilize a video without explicitly estimating camera motion, thus assuming neither motion models nor dominant motion. The method first extracts robust feature trajectories from the input video. Optimization is then performed to find a set of transformations to smooth out these trajectories and stabilize the video. In addition, the optimization also considers quality of the stabilized video and selects a video with not only smooth camera motion but also less unfilled area after stabilization.

Yasuyuki, Eyal, Xiaoou, and Heung-Yeung in "Full-Frame Video Stabilization" published in 2013 IEEE Conference on Computer Vision and Pattern Recognition, pp. 50-57, 2005 IEEE Computer Society Conference on Computer Vision and Pattern Recognition (CVPR'05)—Volume 1, 2005, discloses that video stabilization is an important video enhancement technology which aims at removing annoying shaky motion from videos. Proposed is a practical and robust approach of video stabilization that produces full-frame stabilized videos with good visual quality. The completion method can produce full-frame videos by naturally filling in missing image parts by locally aligning image data of neighboring frames. To achieve this, motion inpainting is proposed to enforce spatial and temporal consistency of the completion in both static and dynamic image areas. In addition, image quality in the stabilized video is enhanced with a new practical deblurring algorithm. Instead of estimating point spread functions, the method transfers and interpolates sharper image pixels of neighbouring frames to increase the sharpness of the frame.

Veon, Mahoor, and Voyles in "Video stabilization using SIFT-ME features and fuzzy clustering" published in IEEE/RSJ International Conference on Intelligent Robots and Systems (IROS), 2011, vol., no., pp. 2377, 2382, 25-30 Sep. 2011 proposes a digital video stabilization process using information that the scale-invariant feature transform (SIFT) provides for each frame. The process uses a fuzzy clustering scheme to separate the SIFT features representing global motion from those representing local motion. The process then calculates the global orientation change and translation between the current frame and the previous frame. Each frame's translation and orientation is added to an accumulated total, and a Kalman filter is applied to estimate the desired motion.

"Image Stabilization improving camera usability", a white paper by Axis communications published on 2014 relates to a combination of gyroscopes and efficient algorithms for modeling camera motion.

U.S. Pat. No. 8,054,881 provides real-time image stabilization using computationally efficient corner detection and correspondence. The real-time image stabilization performs a scene learning process on a first frame of an input video to obtain reference features and a detection threshold value. The presence of jitter is determined in a current frame of the input video by comparing features of the current frame against the reference features using the detection threshold value. If the current frame is found to be unstable, corner points are obtained from the current frame. The obtained corner points are matched against reference corner points of the reference features. If the number of matched corner points is not less than a match point threshold value, the current frame is modeled using random sample consensus. The current frame is corrected to compensate for the jitter based on the results of the modeling.

U.S. Pat. No. 8,385,732 disclose image stabilization techniques used to reduce jitter associated with the motion of a camera. Image stabilization can compensate for pan and tilt (angular movement, equivalent to yaw and pitch) of a camera or other imaging device. Image stabilization can be used in still and video cameras, including those found in mobile devices such as cell phones and personal digital assistants (PDAs).

BRIEF SUMMARY

One aspect of the disclosed subject matter relates to a computer-implemented method for stabilizing a frame, comprising: receiving a frame sequence comprising three or more frames, including a current frame; determining salient feature points within the frames; matching the salient feature points between the frames; dropping salient feature points associated with advancing objects; dropping salient feature points associated with objects moving in shaking movements; computing a transformation between pairs of consecutive frames from amongst the frames, based upon non-dropped salient feature points, thereby obtaining a multiplicity of transformations; determining a center position for the frames based upon the multiplicity of transformations; determining a stabilizing transformation from a current frame to the center position; and applying the stabilizing transformation to the current frame to obtain a stabilized frame. In some exemplary embodiments of the disclosed subject matter, the method may further comprise converting one or more of the frames into a black and white frame. In some exemplary embodiments of the disclosed subject matter, the method may further comprise reducing resolution of one or more of the frames. In some exemplary embodiments of the disclosed subject matter, the method may further comprise adding one or more points to the salient feature points. In some exemplary embodiments of the disclosed subject matter, within the method, dropping the salient feature points associated with objects moving in shaking movements or the salient feature points not associated with advancing objects is optionally performed only for salient feature points appearing in at least a minimal number of frames within the frames. In some exemplary embodiments of the disclosed subject matter, within the method, dropping the salient feature points associated with advancing objects is optionally performed by: determining total flow for a salient feature point over the at least three frames; determining representative flow for a multiplicity of frames of the frames, and an average representative flow by averaging the flow determined for the multiplicity of frames; and dropping salient feature points for which the total flow meets a criterion related to the average representative flow. In some exemplary embodiments of the disclosed subject matter, the method may further comprise providing the total flow for one or more salient feature points. In some exemplary embodiments of the disclosed subject matter, within the method, dropping the salient feature points associated with objects moving in shaking movements is optionally performed only for salient feature points not associated with advancing objects. In some exemplary embodiments of the disclosed subject matter, within the method, dropping the salient feature points associated with objects moving in shaking movements is optionally performed by: determining an amplitude for each salient feature point over the frames; clustering the salient feature point into a first cluster and a second cluster based upon the amplitude, wherein the first cluster has a higher center value than the second cluster; and subject to at most a predetermined percentage of the salient feature points being clustered to the first cluster, dropping salient feature points associated with the first cluster, otherwise dropping salient feature points associated with the second cluster. In some exemplary embodiments of the disclosed subject matter, within the method, dropping the salient feature points associated with advancing objects, is optionally performed only for salient feature points not associated with objects moving in shaking movements. In some exemplary embodiments the method may further comprise providing the amplitude for one or more salient feature point. In some exemplary embodiments of the disclosed subject matter, within the method, the predetermined percentage is optionally between about 15% and about 40%. In some exemplary embodiments the method may further comprise determining proximity between the first cluster and the second cluster, and re-considering a salient feature point associated with a dropped cluster, if close to the center value of a non-dropped cluster. In some exemplary embodiments of the disclosed subject matter, within the method, each frame is optionally stabilized when it is the current frame. In some exemplary embodiments of the disclosed subject matter, within the method, a frame is stabilized only if it is displayed. In some exemplary embodiments of the disclosed subject matter, within the method, computing the transformation between pairs of consecutive frames is optionally based on considering a representative point for each area of the current frame, the representative point determined upon non-dropped salient feature points in the area. In some exemplary embodiments, the method may further comprise dropping incorrectly tracked background points.

Another aspect of the disclosed subject matter relates to a computerized system for determining transition parameters between objects appearing in a first image captured by a first capture device and objects appearing in a second image captured by a second capture device, the system comprising a processor configured to: receiving a frame sequence comprising three or more frames, including a current frame; determining salient feature points within the frames; matching the salient feature points between the frames; dropping salient feature points associated with advancing objects; dropping salient feature points associated with objects moving in shaking movements; computing a transformation between pairs of consecutive frames from amongst the frames, based upon a multiplicity of non-dropped salient feature points, thereby obtaining a multiplicity of transformations; determining a center position for the frames based upon the multiplicity of transformations; determining a stabilizing transformation from a current frame to the center position; and applying the stabilizing transformation to the current frame to obtain a stabilized frame. In some exemplary embodiments of the disclosed subject matter, within the system, dropping the salient feature points associated with advancing objects is optionally performed by: determining total flow for a salient feature point over the frames; determining representative flow for a multiplicity of frames of the frames, and an average representative flow by averaging the flow determined for the multiplicity of frames; and dropping salient feature points for which the total flow meets a criterion related to the average representative flow. In some exemplary embodiments of the disclosed subject matter, within the system, dropping the salient feature points associated with objects moving in shaking movements is optionally performed by: determining an amplitude for each salient feature point over the frames; clustering the salient feature point into a first cluster and a second cluster based upon the amplitude, wherein the first cluster has a higher center value than the second cluster; and subject to at most a predetermined percentage of the salient feature points being clustered to the first cluster, dropping salient feature points associated with the first cluster, otherwise dropping salient feature points associated with the second cluster.

Yet another aspect of the disclosed subject matter relates to a computer program product comprising a computer readable storage medium retaining program instructions, which program instructions when read by a processor, cause the processor to perform a method comprising: receiving a frame sequence comprising three or more frames, including a current frame; determining salient feature points within the frames; matching the salient feature points between the frames; dropping salient feature points associated with advancing objects; dropping salient feature points associated with objects moving in shaking movements; computing a transformation between pairs of consecutive frames from amongst the frames, based upon a multiplicity of non-dropped salient feature points, thereby obtaining a multiplicity of transformations; determining a center position for the frames based upon the multiplicity of transformations; determining a stabilizing transformation from a current frame to the center position; and applying the stabilizing transformation to the current frame to obtain a stabilized frame.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem relates to video stabilization for a camera in a fixed location. Cameras deployed outdoors, or in very large spaces, often experience shaking, due to wind, vibrations caused by passing vehicles, or the like. Shaking may lead to dizziness of operators watching the video, as well as malfunctioning or reduced effectiveness of video analytics procedures applied on the video.

When attempting to stabilize frames captured by a shaking video camera, further complexity is introduced by objects moving regardless of the camera, including advancing objects such as vehicles, people or animals, as well as objects moving in shaking movements, such as leaves, flags, or other objects which may shake even with a slightest wind or vibration. Such moving objects may interfere with the operation of stabilizing algorithms and may result in strong and undesired artifacts, such as shaking which is even stronger than in the original frames.

One technical solution relates to a system and method for stabilizing video frames captured by a fixed camera, and in particular video frames comprising moving or shaking objects. It will be appreciated that the solution is also applicable to a temporary fixed camera, such as a camera mounted on a non-moving vehicle. The solution is also applicable to any pan-tilt-zoom (PZT) camera located at a temporary or permanent location.

The system and method receive a sequence of images, and start by identifying or selecting a group of salient feature points (also referred to as "salient points", "feature points" or "points") within the image sequence.

The system and method then identify points associated with advancing objects and drop them from the group of salient feature points.

The system and method then continue to identify points associated with shaking objects and drop them, too, from the group of salient feature points.

Transformation is then determined between frames, based on the changes in location of non-dropped points, and a center position is determined for the sequence of frames. Based on these changes, a transformation may then be determined for each frame and in particular a current frame, relatively to the center position. The transformation may then be applied to the frames to obtain stabilized frames.

One technical effect of the disclosed subject matter relates to receiving a sequence of frames and stabilizing each frame in the sequence or at least selected frames. Thus, when it is required to watch the sequence, it is more convenient and less tiring for the eyes to watch stabilized frames. Alternatively, the frames may be stabilized only when it is required to display them. Thus, if an amount of footage is captured, only the frames that are actually watched are stabilized, and not all the footage, thus reducing the required processing. The frames may be stabilized in real time, right after being captured, or offline before being stored.

Figure 1:
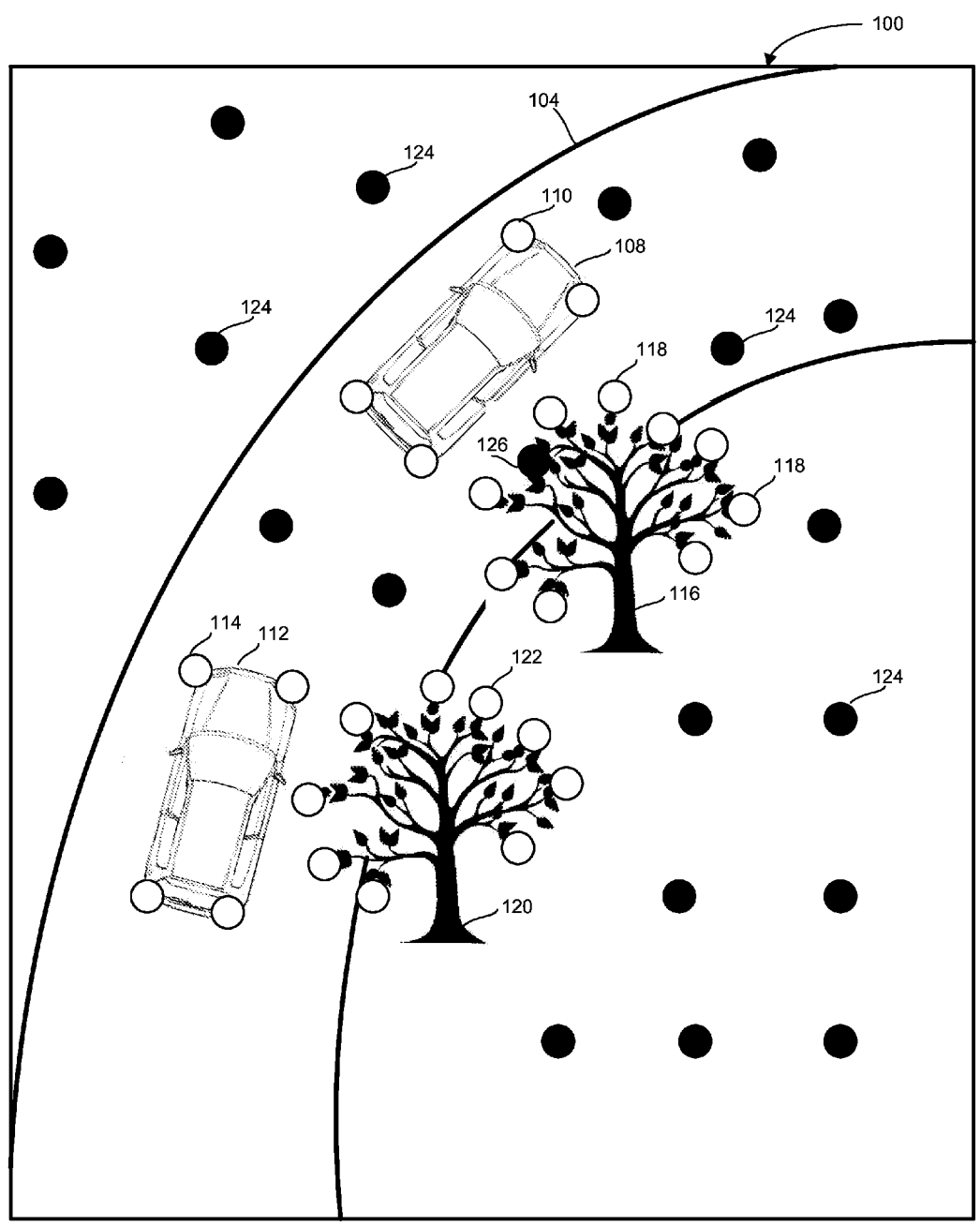
FIG. 1 shows an exemplary illustration of an environment in which the disclosed subject matter may be used.

Referring now to FIG. 1, showing an exemplary frame that may have to be stabilized.

The frame, generally referenced 100, is taken by a video camera (not shown). The frame shows a road 100, and a first car 104 and a second car 108 going along the road. The frame also comprises a first tree 116 and a second tree 120 having branches and leaves that shake in captured frames.

Figure 2:
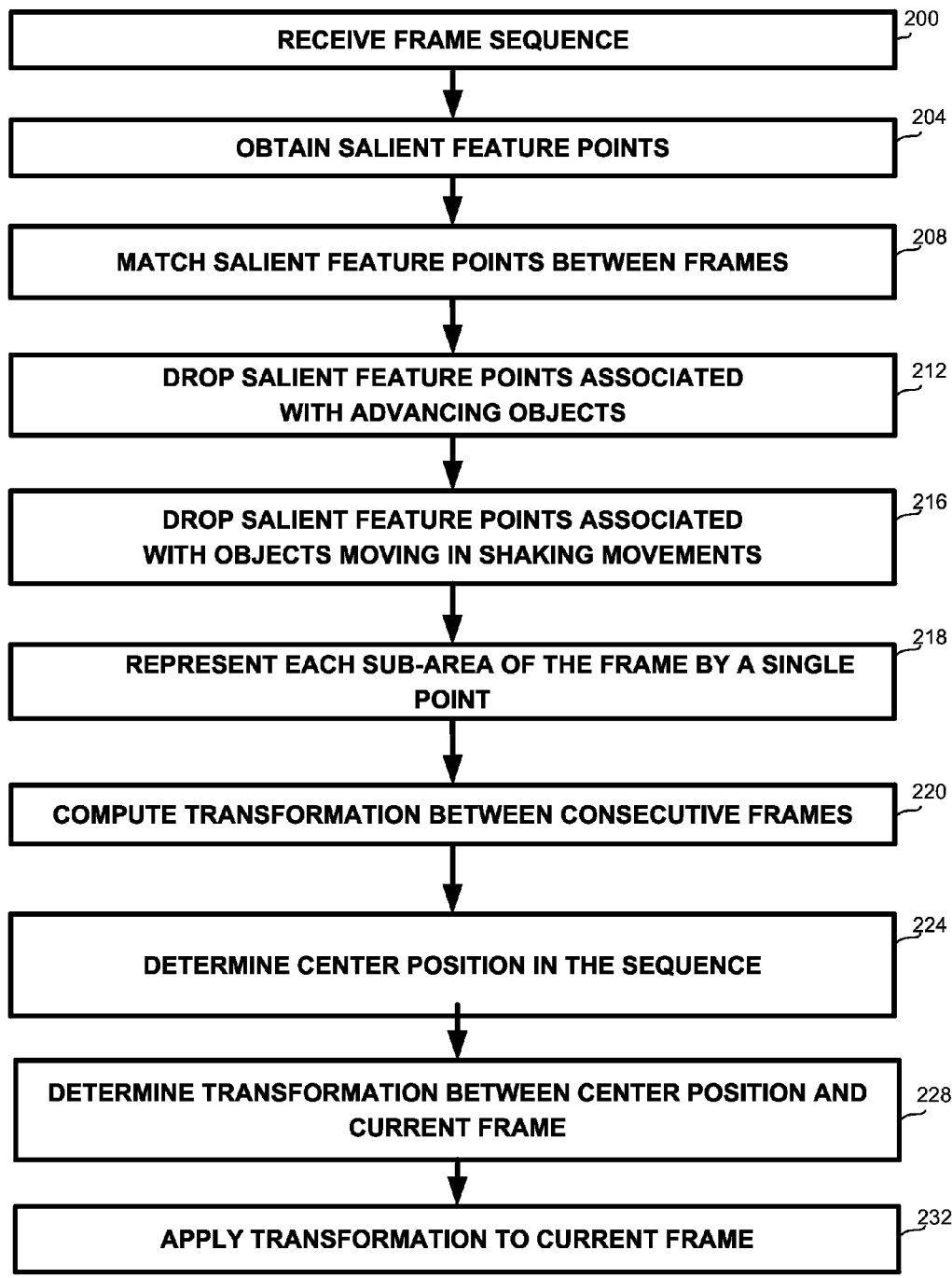
FIG. 2 shows a flowchart of steps in a method for stabilizing a current frame, in accordance with some exemplary embodiments of the disclosed subject matter.

Referring now to FIG. 2, showing a flowchart of steps in a method for stabilizing a sequence of video frames.

On step 200, a frame sequence, comprising at least three digital frames including a current frame, may be received. It will be appreciated that the frames may be received directly from a capture device such as a camera or video camera, from a storage device, from a scanner, or the like. It will also be appreciated that the method may be applied in an ongoing manner, such that for a current frame, the frame itself and preceding frames may be treated as a sequence. When a new frame is later received, the current frame may be treated as part of the frames preceding the newly received one. Some of the calculations detailed below are per frame or per a pair of frames, and may therefore be performed just once and their results may be stored, such that the calculations relates to that frame or frame pair need not be repeated when processing further frames.

It will be appreciated that there is no requirement to store the full images of the sequence throughout the computations as detailed below. Rather it is possible to store only some of the computation results from previous frames, such as the salient feature points, and apply the stabilization to the current frame.

On step 204, salient feature points are obtained for the frame. The term salient feature point refers to an outstanding or noticeable point in the frame, such as a corner of an object, an edge, or the like. The points may be identified, in a non-limiting example, by applying the Shi-Tomasi corner detector algorithm, or by any other corner detection image processing algorithm. In some embodiments, for example when the method is performed offline, the salient feature points may be determined earlier or by another entity and received on step 204, while in online mode, the salient feature points any be determined.

In the exemplary frame of FIG. 1, the salient feature points may include the hollow points, such as point 110 and the other points on corners of car 108, point 114 and the other points on corners of car 112, point 118 and other points on the tips of leaves of tree 116, and point 122 and other points on the tips of leaves of tree 120.

In addition to the salient feature points detected by any algorithm, further points may be determined, for example if the number of detected points is below a predetermined threshold. The predetermined threshold may relate to an absolute number of points per frame or to a number of points relative to the number of points, or pixels, in the frame. In this case, points may be added in areas of the frame in which relatively few salient feature points have been detected, for example points that are far from the detected points in at least a predetermined distance relative to the frame size. Thus, the additional points are added for providing better coverage of the frame. In the example of FIG. 1, the added points include points 124 and any one or more of the other black points. It will be appreciated that some added points may be at or near features not identified in the initial phase of salient feature point detection, such as point 126.

On step 208 the salient feature points may be matched between the frames of the sequence. For example, point 110 will be matched with the point representing the front left corner of car 108 in further frames.

On step 212, salient feature points associated with advancing objects are dropped.

Figure 3:
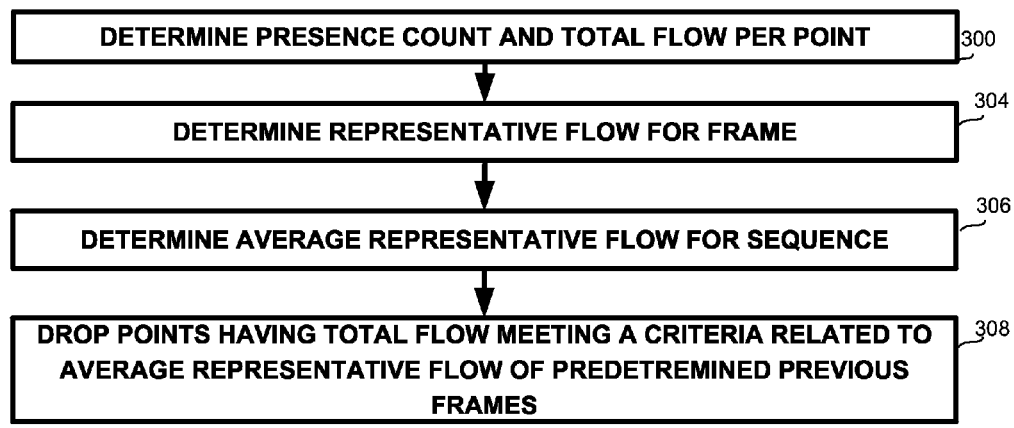
FIG. 3 shows a flowchart of steps in a method for dropping salient feature points associated with advancing objects, in accordance with some exemplary embodiments of the disclosed subject matter.

Referring now to FIG. 3, showing an exemplary method for identifying and dropping salient feature points associated with advancing objects.

On step 300 the following values may be determined:

Presence count for a salient feature point: the number or percentage of frames in the frame sequence in which the salient feature point was detected and matched with corresponding points in other frames within the sequence; and Total flow for a salient feature point: the magnitude of the sum of all displacement vectors of the feature point over time, e.g., the distance between the location of the point in the first frame in which the point appears and its location in the last frame in which the point appears.

The above values may be determined for all salient feature points determined on step 204 of FIG. 2, including the additional salient points. However, it may also be possible to determine the values only for a subset of the points. It will be appreciated that in some situations, the more salient feature points the values are determined for, the more accurate are the obtained results.

On step 304, a representative flow value may be determined for a current frame, which it is required to stabilize. The representative flow value may be a mean, a median, or the like. For example, a representative flow being a mean flow value may be obtained by calculating the average magnitude of the displacement vectors of all salient feature points matched from a previous frame to a current frame.

On step 306, the average representative flow for a sequence of frames may be obtained, for example by averaging the representative flow values for a predetermined number of frames, for example the last 20 frames within the sequence.

On step 308, salient feature points are dropped, for which the total flow meets one or more criteria related to the average representative flow over a number of frames. Dropping points may relate to excluding the points from further computations.

The average representative flow over a number of frames provides an estimate of the average movement of the scene between consecutive frames, over a sequence of a predetermined number of frames. Points whose total flow as determined above meets the criteria, are assumed to be associated with advancing objects like vehicles, fast advancing humans or animals, or the like, and are dropped since they may interfere with estimating the movement of the camera which it is required to stabilize.

The criteria may be, for a non-limiting example, that the total flow of the point is significantly more, for example more than three times, the average representative flow over the predetermined number of frames.

In the example of FIG. 1, step 212 of FIG. 2 will drop points 110, 114, and other points associated with car 108 and car 112.

Referring now back to FIG. 2, on step 216, salient feature points associated with objects moving in shaking movements are dropped.

Figure 4:
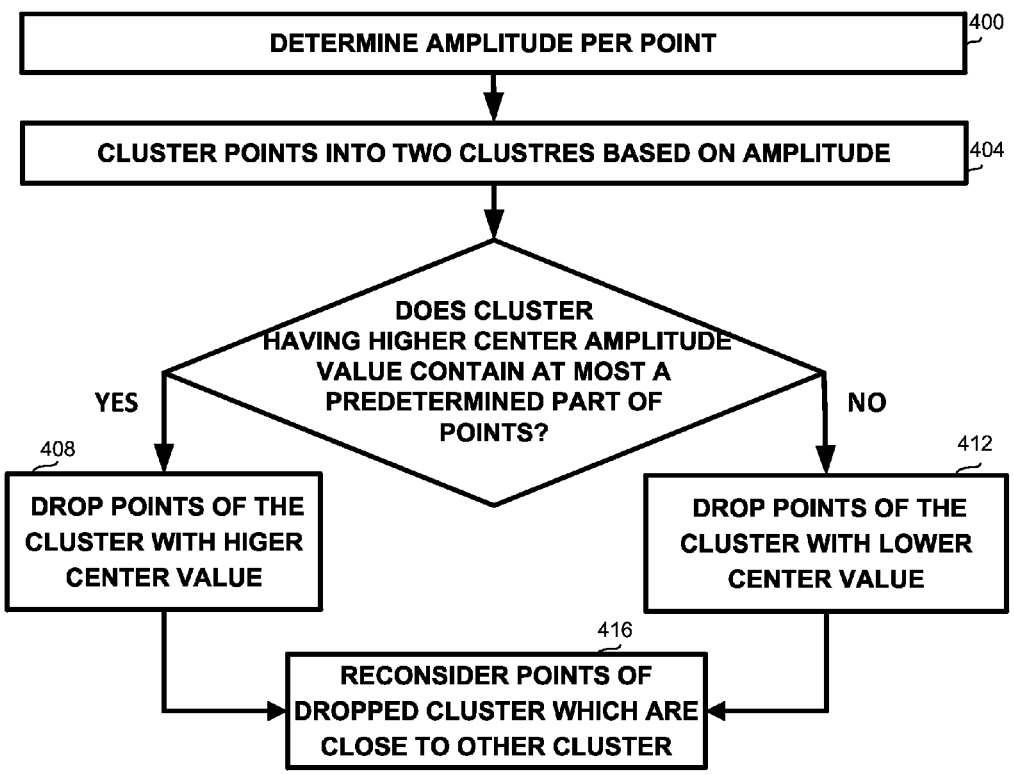
FIG. 4 shows a flowchart of steps in a method for dropping salient feature points associated with objects moving in shaking movements, in accordance with some exemplary embodiments of the disclosed subject matter.

Referring now to FIG. 4, showing an exemplary method for identifying and dropping salient feature points associated with objects moving in shaking movements.

On step 400, an amplitude is determined for a salient feature point: e.g., the maximal distance between two locations of the salient point within the frame sequence.

On step 404, the salient feature points not dropped on step 212 above are clustered into two groups, based on the amplitudes.

Outlier points to be removed are determined after clustering, based on the amplitude of feature points and comparing the number of points in two clusters. For the video stabilization case, outlier points are the points on foreground moving objects like e.g. cars, trees etc., as well as points on the background which are incorrectly tracked.

Each cluster is then associated with a center value, for example the average amplitude of the points associated with the cluster.

Then if the cluster having the higher center value of the two clusters is associated with no more than a predetermined number or percentage of the salient feature points, then on step 408 the points associated with this cluster are dropped, since this cluster is assumed to be of lower confidence than the other cluster. The predetermined percentage may be, in a non-limiting example, between about 15% and about 40% of the points associated with the two clusters, such as about 25%. This situation may be, in some exemplary situations, associated with frames having shaking objects in the foreground, such as trees with shaking branches and leaves. Since these objects are closer to the camera than other objects, their shaking is usually more significant, therefore these points should be eliminated when stabilizing the frame and not influence the stabilized frame as a whole.

If, however, the cluster having the higher center value of the two clusters is associated with at least the predetermined number or percentage of points, this cluster is assumed to be of higher confidence and on step 412 the points of the cluster that has the lower center value are dropped. This action provides for removing outlier points which may have passed advancing point removal step 212 due to wrong feature matching or incorrect tracking. For example, if corner matching as performed for example on step 208 is incorrect, then some salient feature points may be considered to have moved less than other corners, and may thus be associated with low amplitude. If the percentage of the less moving points is lower than the threshold, then the low amplitude cluster may be considered as having low confidence, and may therefore be removed on step 412.

On step 416, the proximity between the centers of the two clusters may be determined. If the clusters are close to each other, then in some situations a smaller number of points should have been removed, since all points are associated with similar amplitude. In order to compensate for the unneeded removal of step 408 or 412, points in the cluster that has been removed, which are associated with an amplitude close to the center value of the other cluster, may be added back to salient feature points, thus keeping points which are not outliers, such as background points. For example, points whose distance from center value of the other cluster is smaller than the distance between the center values of the two clusters may be un-dropped and reconsidered in further computations.

The cluster proximity may be determined, for example, by determining whether the ratio between the center values of the two clusters complies with a criterion, for example if the ratio between the lower center value and the higher center value is above a threshold, for example above 0.8.

It will be appreciated that this process can be generalized to more than two clusters, based on the amplitudes. In such case, points associated with one or more low center clusters may be kept, provided they have together at least a predetermined percentage of the total number of points, while points associated with one or more other clusters may be dropped. A distance metric may be employed to merge clusters having close center values.

Step 216 of FIG. 2 will thus drop points 118, 122 and 126 and other points associated with tree 116 and tree 120 of FIG. 1, if indeed the trees or branches move in shaking movements.

It will be appreciated that the points evaluated above, in association with steps 212 and 216 implemented as FIG. 3 and FIG. 4 may be performed only for salient points having a minimal presence count, i.e. appearing and tracked in at least a predetermined number or percentage of the frames in the sequence.

It will be appreciated that steps 212 and 216 may be performed concurrently or in any order. If performed one after the other, then the later step may operate only on the point not dropped by the first step, so as to save unnecessary computations.

In order to change the influence of individual correspondences, steps taking into account the spatial distribution of the points may be applied. In one embodiment, on step 218, the frame may be divided into sub-areas of equal size, for example 64*64 pixels. The transformation between consecutive frames may then be determined by combining all non-dropped salient feature points within each sub-area into a representative point, for example by averaging the salient feature points within the sub-area, and determining the transformation based on the difference between the locations of the representative points in corresponding sub-areas of the frames. Using representative points provides for assigning the same effect or weight to all sub-areas of the frame. The initial determination of the points, including corner points and additional points may ensure that each sub-area of the frame contains at least one point. Alternatively, if a sub-area does not contain any points, it may be considered irrelevant for stabilization and thus no harm may be caused if it is not considered.

Referring now back to FIG. 2, on step 220, a transformation between pairs of consecutive frames may be determined based on the non-dropped points, wherein the transformation may be expressed as a transformation matrix. In some embodiments, the transformation between consecutive frames may be determined based on the representative points determined for the frame areas as disclosed above in association with step 218. The transformation between the current frame and the previous one may be determined every time a new current frame is received. The transformation matrix may be determined as the optimal affine transformation between two sets of points.

On step 224, a center position within the sequence is determined based on the frame-to-frame transformations determined for each pair of frames on step 220.

On step 228, a stabilizing transformation is determined from the current frame to the center position determined on step 224, and on step 232 the stabilizing transformation may be applied to the current frame to obtain a stabilized frame.

The stabilized frames may then be displayed to a user. In addition, other measures such as the amplitude or flow per pixel or per salient feature point may be used to quantify the camera shaking in terms of shaking extent and frequency, and may also be displayed to a user or used for triggering one or more actions.

Steps 212 and 216 may eliminate at least many of the points associated with advancing objects and shaking objects, and leave mainly the points associated with fixed objects, upon which the camera movements may be determined and stabilized. Stabilization is achieved by applying transformation to the frames, thus bringing the frames closer to "an average" of a sequence of frames, thus eliminating sharp changes.

It will be appreciated that the method is repeated for each current frame it is required to stabilize.

When displaying the video as captured, each frame when received may be the current frame and may be stabilized. However, in some embodiments, stabilization may be performed for selected frames only. When the captured frames are not displayed but are stored, then stabilization may be performed only upon need, and prior to displaying.

In further embodiments, whether a frame sequence is stabilized or not may be determined by a viewer, and upon changing needs. For example, for ongoing human traffic monitoring, stabilizing may be performed in order to reduce dizziness of a viewer. However when investigating sequences containing critical frames, some frames may remain unstabilized so as not to lose any information.

It will be appreciated that if a change in resolution occurs, such that after receiving one or more frames with a particular resolution, another one or more frames within the sequence are received with different resolution, then all salient feature points and other calculations performed may be ignored, and the calculations may be restarted to avoid inaccuracies due to the different resolutions.

Figure 5:
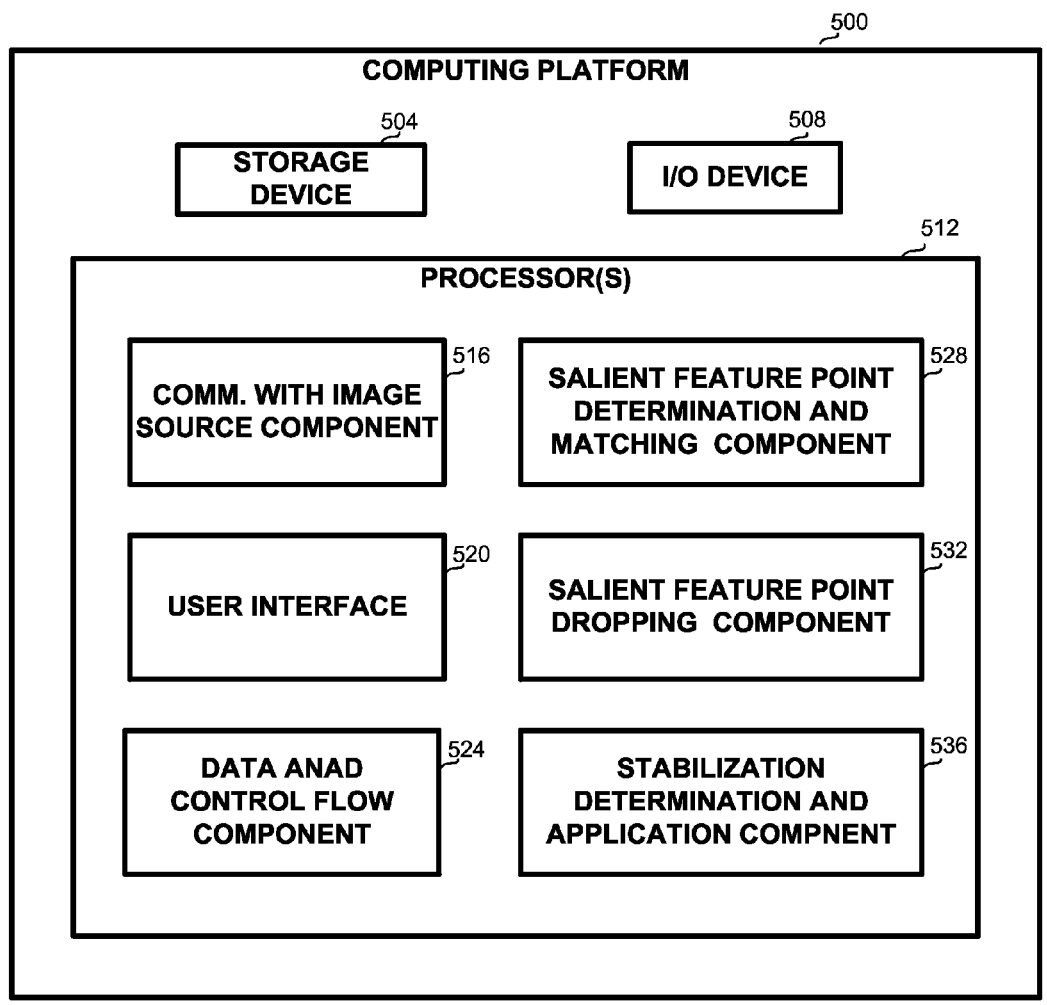
FIG. 5 shows a block diagram of a system for stabilizing a sequence of frames, in accordance with some exemplary embodiments of the disclosed subject matter.

Referring now to FIG. 5, showing a block diagram of a system for stabilizing a sequence of frames.

The system may be implemented as a computing platform 500, such as a server, a desktop computer, a laptop computer, a processor embedded within a video capture device, or the like.

In some exemplary embodiments, computing platform 500 may comprise a storage device 504. Storage device 504 may comprise one or more of the following: a hard disk drive, a Flash disk, a Random Access Memory (RAM), a memory chip, or the like. In some exemplary embodiments, storage device 504 may retain program code operative to cause processor 512 detailed below to perform acts associated with any of the components executed by computing platform 500.

In some exemplary embodiments of the disclosed subject matter, computing platform 500 may comprise an Input/Output (I/O) device 508 such as a display, a pointing device, a keyboard, a touch screen, or the like. I/O device 508 may be utilized to provide output to or receive input from a user.

Computing platform 500 may comprise a processor 512. Processor 512 may comprise any one or more of the following processing units, such as but not limited to: a Central Processing Unit (CPU), a microprocessor, an electronic circuit, an Integrated Circuit (IC), a Central Processor (CP), or the like. In other embodiments, processor 512 may be a graphic processing unit. In further embodiments, processor 504 may be a processing unit embedded on a video capture device. Processor 512 may be utilized to perform computations required by the system or any of its subcomponents. Processor 512 may comprise one or more processing units in direct or indirect communication. Processor 512 may be configured to execute several functional modules in accordance with computer-readable instructions implemented on a non-transitory computer usable medium. Such functional modules are referred to hereinafter as comprised in the processor.

The modules, also referred to as components as detailed below, may be implemented as one or more sets of interrelated computer instructions, loaded to and executed by, for example, processor 504 or by another processor. The components may be arranged as one or more executable files, dynamic libraries, static libraries, methods, functions, services, or the like, programmed in any programming language and under any computing environment.

Processor 512 may comprise communication with image source component 516 for communicating with an image source, such as a storage device storing images, a capture device, or the like. In some embodiments, the frames may be stored on storage device 512.

Processor 512 may comprise user interface 520 for receiving information from a user, such as thresholds or other parameters, for showing results to a user, such as displaying a sequence of stabilized frames, or the like, using for example any of I.O devices 508.

Processor 512 may comprise data and control flow component 524 for controlling the activation of the various components, providing the required input and receiving the required output from each component.

Processor 512 may comprise salient feature point determination and matching component 524 for detecting salient feature points by one or more algorithms, adding points in addition to the salient feature points detected by the user algorithm, and matching corresponding salient feature points appearing in two or more frames, as described in association with steps 204 and 208 of FIG. 2.

Processor 512 may comprise salient feature point dropping component 532 for dropping salient feature points associated with advancing objects as described on step 212 of FIG. 2 and FIG. 3, or dropping salient feature points associated with objects moving in shaking movements, as described on step 216 of FIG. 2 and FIG. 4.

Processor 512 may comprise stabilization determination and application component 536 for determining and applying the stabilization transformation between frames based on the non-dropped salient feature points, as disclosed in association with steps 220, 224, 228 and 232 of FIG. 2.

The method and system may be used as a standalone system, or as a component for implementing a feature in a system such as a video camera, or in a device intended for specific purpose such as camera state monitoring, video anomaly detection, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It will also be noted that each block of the block diagrams and/or flowchart illustration may be performed by a multiplicity of interconnected components, or two or more blocks may be performed as a single block or step.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A computer-implemented method for stabilizing a frame, comprising:
  receiving a frame sequence comprising at least three frames, including a current frame;
  determining salient feature points within the at least three frames; matching the salient feature points between the at least three frames; dropping salient feature points associated with advancing objects;
  dropping salient feature points associated with objects moving in shaking movements, comprising:
  determining an amplitude for each salient feature point over the at least three frames;
  clustering the salient feature point into a first cluster and a second cluster based upon the amplitude, wherein the first cluster has a higher center value than the second cluster; and
  subject to at most a predetermined percentage of the salient feature points being clustered to the first cluster, dropping salient feature points associated with the first cluster, otherwise dropping salient feature points associated with the second cluster;
  computing a transformation between pairs of consecutive frames from amongst the at least three frames, based upon non-dropped salient feature points, thereby obtaining a multiplicity of transformations;
determining a center position for the at least three frames based upon the multiplicity of transformations;
determining a stabilizing transformation from a current frame to the center position; and
applying the stabilizing transformation to the current frame to obtain a stabilized frame.

2. The method of claim 1, further comprising converting at least one of the at least three frames into a black and white frame.

3. The method of claim 1, further comprising reducing resolution of at least one of the at least three frames.

4. The method of claim 1, further comprising adding at least one point to the salient feature points.

5. The method of claim 1, wherein dropping the salient feature points associated with objects moving in shaking movements or the salient feature points not associated with advancing objects is performed only for salient feature points appearing in at least a minimal number of frames within the at least three frames.

6. The method of claim 1, wherein dropping the salient feature points associated with advancing objects is performed by:
determining total flow for a salient feature point over the at least three frames;
determining representative flow for a multiplicity of frames of the at least three frames, and an average representative flow by averaging the flow determined for the multiplicity of frames; and
dropping salient feature points for which the total flow meets a criterion related to the average representative flow.

7. The method of claim 6, further comprising providing the total flow for at least one salient feature point.

8. The method of claim 6, wherein dropping the salient feature points associated with objects moving in shaking movements is performed only for salient feature points not associated with advancing objects.

9. The method of claim 1, wherein dropping the salient feature points associated with advancing objects, is performed only for salient feature points not associated with objects moving in shaking movements.

10. The method of claim 1, further comprising providing the amplitude for at least one salient feature point.

11. The method of claim 1, wherein the predetermined percentage is between about 15% and about 40%.

12. The method of claim 1, further comprising determining proximity between the first cluster and the second cluster, and re-considering a salient feature point associated with a dropped cluster, if close to the center value of a non-dropped cluster.

13. The method of claim 1, wherein each frame is stabilized when it is the current frame.

14. The method of claim 1, wherein a frame is stabilized only if it is displayed.

15. The method of claim 1, wherein computing the transformation between pairs of consecutive frames is based on considering a representative point for each sub-area of the current frame, the representative point determined upon non-dropped salient feature points in the sub-area.

16. The method of claim 1, further comprising dropping incorrectly tracked background points.

17. A computerized system for determining transition parameters between objects appearing in a first image captured by a first capture device and objects appearing in a second image captured by a second capture device, the system comprising a processor configured to:
receiving a frame sequence comprising at least three frames, including a current frame;
determining salient feature points within the at least three frames;
matching the salient feature points between the at least three frames;
dropping salient feature points associated with advancing objects;
dropping salient feature points associated with objects moving in shaking movements, comprising:
determining an amplitude for each salient feature point over the at least three frames;
clustering the salient feature point into a first cluster and a second cluster based upon the amplitude, wherein the first cluster has a higher center value than the second cluster; and
subject to at most a predetermined percentage of the salient feature points being clustered to the first cluster, dropping salient feature points associated with the first cluster, otherwise dropping salient feature points associated with the second cluster;
computing a transformation between pairs of consecutive frames from amongst the at least three frames, based upon a multiplicity of non-dropped salient feature points, thereby obtaining a multiplicity of transformations determining a center position for the at least three frames based upon the multiplicity of transformations;
determining a stabilizing transformation from a current frame to the center position; and applying the stabilizing transformation to the current frame to obtain a stabilized frame.

18. The system of claim 17, wherein dropping the salient feature points associated with advancing objects is performed by:
determining total flow for a salient feature point over the at least three frames;
determining representative flow for a multiplicity of frames of the at least three frames, and an average representative flow by averaging the flow determined for the multiplicity of frames; and
dropping salient feature points for which the total flow meets a criterion related to the average representative flow.

19. A computer program product comprising a non-transitory computer readable storage medium retaining program instructions, which program instructions when read by a processor, cause the processor to perform a method comprising:
receiving a frame sequence comprising at least three frames, including a current frame;
determining salient feature points within the at least three frames;
matching the salient feature points between the at least three frames;
dropping salient feature points associated with advancing objects;
dropping salient feature points associated with objects moving in shaking movements, comprising:
determining an amplitude for each salient feature point over the at least three frames;
clustering the salient feature point into a first cluster and a second cluster based upon the amplitude, wherein the first cluster has a higher center value than the second cluster; and subject to at most a predetermined percentage of the salient feature points being clustered to the first cluster, dropping salient feature points associated with the first cluster, otherwise dropping salient feature points associated with the second cluster;

computing a transformation between pairs of consecutive frames from amongst the at least three frames, based upon a multiplicity of non-dropped salient feature points, thereby obtaining a multiplicity of transformations;

determining a center position for the at least three frames based upon the multiplicity of transformations;

determining a stabilizing transformation from a current frame to the center position; and applying the stabilizing transformation to the current frame to obtain a stabilized frame.

* * * * *